United States Patent [19]

Pitha et al.

[11] Patent Number: 5,426,184

[45] Date of Patent: Jun. 20, 1995

[54] CYCLODEXTRIN GLYCOSIDES AND PROCESSES FOR THEIR PREPARATION

[75] Inventors: Josef Pitha, Baltimore, Md.; Thomas Wimmer, Munich, Germany

[73] Assignee: The United States of America as represented by the Department of Health and Human Services, Washington, D.C.

[21] Appl. No.: 16,449

[22] Filed: Feb. 11, 1993

[30] Foreign Application Priority Data

Feb. 12, 1992 [DE] Germany .................. 42 04 315.8

[51] Int. Cl.$^6$ .............................................. C08B 37/16
[52] U.S. Cl. ...................................... 536/17.2; 536/46; 536/103; 536/124
[58] Field of Search ............... 536/46, 103, 124, 17.2; 514/58

[56] References Cited

U.S. PATENT DOCUMENTS

| | | | |
|---|---|---|---|
| 4,424,346 | 1/1984 | Hall et al. | 514/58 |
| 4,956,351 | 9/1990 | Mesens et al. | 514/58 |
| 5,037,969 | 8/1991 | Minami et al. | 536/4.1 |
| 5,241,072 | 8/1993 | Colon et al. | 536/124 |

FOREIGN PATENT DOCUMENTS 1138202  5/1989 Japan .
WO92/12180  7/1992 WIPO .

OTHER PUBLICATIONS

A. Craft et al. "Synthesis of Chemically Modified Cyclodextrins" *Tetrahedron*, (39) 9, pp. 1417–1474 (1983).
International Search Report on International Application No. PCT/US94/00102 dated Apr. 14, 1994.
Y. Kawajuchi et al., "Sorption Behavior of Aromatic Compounds in Water on β-Cyclodextrin Polyurethane Resins" *Bull. Chem. Soc. Japan*, (55) pp. 2611–2614 (1982).
Y. Okada et al., "Some Properties and the Inclusion Behavior of Branched Cyclodextrins," Chem. Pharm. Bull. 36 (6) pp. 2176–2185 (1988).
Y. Yoshimura et al. "Structure of Di-O-β-Maltosyl Cyclodextrins produced from α-Maltosylfluoride and Cyclodextrins," Agric. Biol. Chem. 54 (10) pp. 2585–2591 (1990).
K. Koizumi et al., "Isolation and characterization of three positional isomers of diglucosylcyclomaltoheptaose," Carbohydr. Res., pp. 125–134 (1990).
R. Palepu et al., "Solution Inclusion Complexes of Cyclodextrins with Sodium Perfluorooctanoate" 67 Can. J. Chem., pp. 1550–1553 (1989).
Croft et al., "Synthesis of Chemically Modified Cyclodextrins", Tetrahedron, vol. 39, No. 9, pp. 1417 to 1474 (1983).

*Primary Examiner*—Ronald W. Griffin
*Attorney, Agent, or Firm*—Leydig, Voit & Mayer, Ltd.

[57] ABSTRACT

The invention relates to cyclodextrin glycosides and processes for their preparation. The cyclodextrin glycosides according to the invention are cyclodextrins substituted by 2-acetamido-2-deoxyaldoses. These cyclodextrin glycosides are prepared by a process which is characterized in that cyclodextrins are reacted with 2-acetamido-2-deoxyaldoses in an anhydrous acid medium and the reaction products are then treated with a mild base. The cyclodextrin glycosides can be used for solubilization of substances which are sparingly soluble or insoluble in water.

17 Claims, No Drawings

CYCLODEXTRIN GLYCOSIDES AND PROCESSES FOR THEIR PREPARATION

BACKGROUND OF THE INVENTION

The invention relates to cyclodextrin glycosides and processes for their preparation.

Cyclodextrins, also called cycloamyloses, cyclo-malto-oligosaccharides or Schardinger dextrins, are cyclic (1→4) α-linked glucopyranoses. They are prepared by enzymatic degradation of starch. Cyclohexa-, cyclohepta-, and cycloocta-amylose, also called α-, B, γ-cyclodextrin, are mainly formed by this process.

In addition to these cyclodextrins, branched cyclodextrins are also known. These are also called cyclodextrin glycosides of $G_n$-cycloamyloses, n indicating the number of α-D-glucopyranosyl groups in the side chains. They are thus cyclodextrins in which at least one hydroxyl group is linked to glucose, maltose, maltotriose or also generally to substituted or unsubstituted malto-oligosaccharides. Only cyclodextrin glycosides containing unsubstituted malto-oligosaccharides can be prepared to date.

The branched cyclodextrins are chiefly prepared by the action of enzymes on a mixture of the cyclodextrins and maltose or maltotriose, such as is described for example, in the paper "Some Properties and the Inclusion Behavior of Branched Cyclodextrins" by Y. Okada, Y., Kubota, K. Kiozumi, S. Hizukuri, T. Ohfuji and K. Ogata in Chem. Pharm. Bull. 36 (6), 2176–2185 (1988).

A preparation of di-O-α-maltosyl-B-cyclodextrin $((G_2)_2$-B-cyclodextrin) from maltosyl fluoride and cyclodextrins with subsequent enzymatic degradation to give di-0-glucosyl derivatives is to be found in the paper "Structure of Di-0-α-Maltosyl Cyclodextrins produced from α-Maltosylfluoride and Cyclodextrins" by Y. Yoshimura et al. in Agric. Biol. Chem. 54 (10), 2585–2591 (1990).

It is also known that the mother liquors of industrial B-cyclodextrin preparations also contain small amounts of branched cyclodextrins (K. Koizumi et al., Carbohydr. Res. 201, 125–134 (1990)).

All of the processes described so far have the common features of the use of enzymes for the preparation of the branched cyclodextrins and an expensive isolation of amounts in the mg to g scale.

The pyrolysis of B-cyclodextrin in a temperature range from 135° C. to 220° C. leading to branched cyclodextrins is moreover the subject matter of U.S. Pat. No. 4,904,307. Pyrolysis of a mixture of glucose and cyclodextrins at a temperature of 160° C. in the presence of catalytic amounts of a fumaric acid gives similar results (T. Okemoto, K. Hara, H. Ishigami, K. Mikuni, T. Oosawa, Jpn. Kokai JP 89,138,202 (1989)).

The high reaction temperature during the preparation of the branched cyclodextrins is a disadvantage in both cases. It leads to unwanted by-products and makes working up and purification of the reaction products is difficult.

All the branched cyclodextrins prepared by the processes mentioned so far are cyclodextrin glycosides in which the cyclodextrin is linked with glucose or oligomers of glucose, such as, for example, maltose or malto-oligosaccharides.

SUMMARY OF THE INVENTION

The object of the invention was to provide further glycosides of cyclodextrin. Another object of the invention was to provide a process for the preparation of the cyclodextrin glycosides according to the invention.

The invention relates to cyclodextrin glycosides, which are characterized in that the cyclodextrins are substituted with 2-acetamido-2-deoxyaldoses.

DETAILED DESCRIPTION

The cyclodextrin glycosides according to the invention can be prepared by reaction of cyclodextrins with 2-acetamido-2-deoxyaldoses in an anhydrous acid medium and subsequent treatment of the reaction products with a mild base. They can also be prepared by reaction of cyclodextrins with oxazoline derivatives of the 2-acetamido-2-deoxyaldoses. The cyclodextrin glycosides according to the invention are purified by methods which are known from the prior art.

In a preferred embodiment, the cyclodextrins are substituted by N-acetylglucosamine, N-acetylmannosamine and/or N-acetylgalactosamine.

In a particularly preferred embodiment, the cyclodextrin is substituted with N-acetylglucosamine.

In the branched cyclodextrins according to the invention, preferably 1 to 10 of the OH groups of the cyclodextrin are substituted by 2-acetamido-2-deoxyaldoses.

Suitable starting substances for the preparation of the cyclodextrin glycosides according to the invention are all the cyclodextrins, such as, for example, α, B or γ-cyclodextrin.

Preferred suitable starting substances are B-cyclodextrin and γ-cyclodextrin.

Surprisingly, it has been found that 2-acetamido-2-deoxyaldoses or acetylated, preferably peracetylated, derivatives thereof, but not glucose, are suitable starting substances for carrying out the process according to the invention.

To prepare the cyclodextrin glycosides the cyclodextrin and 2-acetamido-2-deoxyaldose and/or acetylated derivatives thereof are introduced simultaneously or in succession into an anhydrous acid solvent in a molar ratio of 1:1 to 1:10. Increasing the 2-acetamido-2deoxyaldose concentration in the reaction mixture leads to an increase in the yield of polyglycosylated cyclodextrin glycosides. Examples of suitable anhydrous acid solvents are halogenated acetic acid derivatives, and trifluoroacetic acid (TFA) or hydrogen fluoride (HF) are particularly suitable. The substances dissolve and the reaction proceeds at room temperature or elevated temperature, that is to say up to 95° C., preferably in a temperature range from 40° C. to 80° C. over a period of one hour to 3 days, preferably 7 to 10 hours.

The reaction mixture is then brought to an alkaline pH value (pH 8 to 10) with a mild base and stirred at 20°–30° C. for 2 to 24 hours. A concentrated ammonia solution or an aqueous solution of an amine or a sodium bicarbonate solution, for example, can be employed as the mild base. Preferably, before addition of the mild base, the TFA and/or its derivatives are removed as substantially as possible from the reaction mixture. This is effected, for example, by distillation in vacuo.

The cyclodextrins and the cyclodextrin derivatives according to the invention are then precipitated. This is effected, for example, by first concentrating the mixture to a syrup by distillation and then precipitating the cyclodextrins and cyclodextrin derivatives from this syrup by addition of acetone. The precipitate is washed and dried.

The dried precipitate is dissolved. Water, for example, can be used as the solvent. The unsubstituted cyclodextrins are precipitated from the aqueous solution. This can be effected, for example, by adding known cyclodextrin complexing agents, such as, for example, toluene, cyclohexane or p-cymene to the solution and filtering off the cyclodextrin as a poorly water-soluble cyclodextrin-toluene complex.

The filtrate is dried, and consists mainly of the cyclodextrin derivatives according to the invention.

Another purification of these cyclodextrin derivatives can be carried out, for example, by column chromatography or preparative high performance liquid chromatography, as known from the prior art.

The cyclodextrin derivatives according to the invention can be used for all applications such as are known for cyclodextrins. They are particularly suitable, for example, for solubilizing substances which are sparingly soluble or insoluble in water.

The following examples serve to further illustrate the invention. The course of the reaction in the conversions described in the examples was monitored by means of thin layer chromatography. TFA and trifluoroacetate ions form strong complexes with cyclodextrins. Constants of 0, 4,500 and 600 mol$^{-1}$ have thus been found, for example, for the association of sodium perfluoroacetate with α-, B- and γ-cyclodextrin respectively in the paper "Solution Inclusion Complexes of Cyclodextrins with Sodium Perfluorooctanoate" by R. Palepu and V. C. Reinsborough in Can. J. Chem. 67, 1550–1553 (1989). These substances must therefore be removed, for example, by extraction by acetone, from the samples to be monitored before the thin layer chromatography.

Various methods of mass spectroscopy were used as analytical methods for identification of the products. Fast atom bombardment mass spectroscopy (FABMS) was carried out on a VG 7070E-HF spectrometer in a thioglycerol/water matrix. The intensities are stated in values in relation to the most intense peak (=100%) in the range from 400 to 2000 m/z.

Californium-252 was used as the ionization source in the plasma desorption mass spectroscopy (PDMS).

The thin layer chromatography was carried out as follows:

1-2 μl of a 5% solution of the sample in water were applied to pre-coated plates for thin layer chromatography (silica gel 60 F/254; Merck) and developed in a mobile phase of 1-propanol, water, ethyl acetate and concentrated ammonia solution (6:3:1:1) for 2-4 hours. After the development, the plates were dried, immersed briefly in Vaugh's reagent (1 g of cerium sulfate, 24 g of ammonium molybdate, 50 ml of concentrated sulfuric acid and 450 ml of water) and heated with a hot air gun until the samples became visible as blue spots. As can be clearly seen in the following table, an increasing introduction of saccharides in a certain series has the effect of decreasing the $R_f$ values. The $R_f$ value is defined as the quotient of the migration zone of the sample divided by the migration zone of the solvent front.

| Compound | $R_f$ Value | Source |
|---|---|---|
| Glucose | 0.34 | Sigma |

-continued

| Compound | $R_f$ Value | Source |
|---|---|---|
| Maltotriose | 0.24 | Sigma |
| Maltotetraose | 0.19 | Sigma |
| Maltopentaose | 0.15 | Sigma |
| Maltohexaose | 0.12 | Sigma |
| Maltoheptaose | 0.08 | Sigma |
| N-acetylglucosamine | 0.41 | Lancaster |
| N,N',N''-triacetyl-chitotriose | 0.30 | Sigma |
| α-Cyclodextrin | 0.21 | American Maize Co. |
| B-Cyclodextrin | 0.18 | American Maize Co. |
| γ-Cyclodextrin | 0.14 | American Maize Co. |
| B-Cyclodextrin | 0.18 | American Maize Co. |
| Glucosyl-B-cyclodextrin | 0.11 | Tokuyama Soda Co. |
| Maltosyl-B-cyclodextrin | 0.09 | Tokuyama Soda Co. |
| Dimaltosyl-B-cyclodextrin | 0.05 | Tokuyama Soda Co. |

The following experimental results are offered by way of example and not by limitation.

EXAMPLE 1

Condensation of α-, B-, and γ-cyclodextrin with N-Acetylglucosamine a. Condensation of B-cyclodextrin with N-Acetylglucosamine A total of 5.53 g (0.025 mol) of N-acetylglucosamine were added in portions to a solution of 28.38 g (0.025 mol) of dried B-cyclodextrin in 55 ml of TFA in the course of 5 hours, while stirring. The pale yellow solution was stirred overnight at room temperature. The trifluoroacetic acid was then distilled off in vacuo and the residue was dissolved in 100 ml of concentrated ammonia. To split any trifluoroacetic acid esters possibly formed, the now basic solution was stirred at room temperature for 3 hours. The solution was concentrated to a syrup in vacuo. A precipitate was obtained by addition of 100 ml of acetone, and was filtered off, washed three times with 50 ml of acetone each time and dried in vacuo at 30° C. (While ammonium trifluoroacetate is very readily soluble in acetone, cyclodextrins and derivatives thereof are precipitated efficiently by this solvent). The dried precipitate was then dissolved in 400 ml of hot water, the solution was cooled to 5° C. and 50 ml of toluene were added in order to precipitate the poorly water-soluble B-cyclodextrin-toluene complex. After 12 hours, the precipitate was filtered off, the filtrate was concentrated to 100 ml and the precipitation was repeated with 10 ml of toluene. The filtrate was concentrated to dryness and gave 1.235 g of a yellow solid which consists mainly of B-cyclodextrin ($R_f$=0.18; PDMS: (M+Na)+ 1157.5 m/z, (M+K)+ 1174.2 m/z) and 2-acetamido-2-deoxyglucosyl-B-cyclodextrin ($R_f$=0.14; PDMS: (M+Na)+ 1361.6 m/z, (M+K)+ 1377.7 m/z). The individual compounds were isolated as follows by column chromatography from the mixture thus prepared and were purified. 500 mg of the sample were introduced onto a silica gel column (silica gel F60, particle size 0.063–0.200 mm, column size 40 cm × 1.5 cm) and eluted with 1-propanol, concentrated ammonia and water (5:3:2). 150 mg of crystalline 2-acetamido-2-deoxyglucosyl -B-cyclodextrin ($R_f$=0.14; FABMS (M+H)+ 1338.7, (M+Na)+ 1360.7) were able to be isolated in this manner, and were finally recrystallized from water-ethanol (1:2). A further fraction (10 mg; $R_f$=0.11; FABMS (M+H)+ 1541.8, (M+Na)+

1563.7) consisted of the disubstituted derivative. The sequence of elution in this system is unsubstituted B-cyclodextrin and mono- and disubstituted derivatives.

b. Condensation of γ-cyclodextrin with N-Acetyl-glucosamine

The reaction and working up were carried out as described under a. with 20.0 g (0.015 mol) of γ-cyclodextrin and 3.41 g (0.015 mol) of N-acetylglucosamine in 60 ml of trifluororoacetic acid. Unsubstituted γ-cyclodextrin was precipitated twice with p-cymene. The product was obtained as a pale yellowish powder (2.02 g), which contained γ-cyclodextrin ($R_f$=0.14; FABMS: (M+Na)+ at 1319.7 m/z, 49%) and 2-acetamido-2-deoxyglucosyl-γ-cyclodextrin ($R_f$=0.11; FABMS: (M+H)+ at 1500.9 m/z, 66% and (M+Na)+ at 1522.9 m/z, 100%) in a ratio of 1:3.

c. Condensation of α-cyclodextrin with N-acetyl-glucosamine

The reaction and working up were carried out in accordance with a. with 4.87 g (0.005 mol) of α-cyclodextrin and 1.11 g (0.005 mol) of N-acetylglucosamine in 15 ml of trifluoroacetic acid, unsubstituted α-cyclodextrin being precipitated twice as a cyclohexane complex. The product was obtained as a yellow solid consisting of α-cyclodextrin ($R_f$=0.21; FABMS: (M+Na)+ at 995.5 m/z, (100%) and 2 acetamido-2-deoxyglucosyl-α-cyclodextrin ($R_f$=0.15; FABMS: (M+H)+at 1176.6 m/z, 13% and (M+Na)+at 1198.6 m/z) in a ratio of 3:1.

EXAMPLE 2

Condensation of B-cyclodextrin with N-acetyl-glucosamine, N-acetylmannosamine, N-acetylgalactosamine and glucose In each experiment, 1.362 g (1.2 remol) of dried B-cyclodextrin were dissolved in 10 ml of trifluoroacetic acid, 0.398 g (1.8 mol) or the 2-acetamido-2-deoxyaldoses or 0.324 g (1.8 mmol) of glucose was added and the more or less red-colored solutions were stirred at 23° C. for 180 minutes. The solvent was then stripped off in vacuo, the residue was dissolved in 10 ml of cold concentrated ammonia solution and the solution was stirred overnight and brought to dryness under reduced pressure. The substance thus obtained was extracted with acetone in a Soxhlet apparatus for 6 hours and the resulting powder was dried at 90° C. and dissolved in 4 ml of hot water. The solution was kept at 5° C. for 15 hours and the B-cyclodextrin which had crystallized out was centrifuged off. 3 ml of the supernatant clear solution were concentrated, and the composition thereof was determined by means of FAB mass spectroscopy. The (M+Na)+peaks of the mono-2-acetamido-2-deoxyaldosyl-B-cyclodextrins werem found at 1360.5−0.2 m/z and the (M+Na)+peaks of the di-2-acetamido-2-deoxyaldosyl-B-cyclodextrins at 1563.4 m/z. The following table shows the experimental results using the monosaccharides listed.

| MONOSACCHARIDE EMPLOYED | MOLAR RATIO OF B-CYCLODEXTRIN/ MONOSUBSTITUTED/ DISUBSTITUTED | YIELD OF MONOSUBSTITUTED | YIELD OF DISUBSTITUTED |
|---|---|---|---|
| N-ACETYL-GLUCOSAMINE | 1:0.32:0 | 4.6% | 0% |
| N-ACETYL-MANNOSAMINE | 1:0.80:0.11 | 17% | 2.3% |
| N-ACETYL-GALACTOSAMINE | 1:0.88:0.12 | 11% | 1.5% |
| GLUCOSE | 1:0:0 | 0% | 0% |

EXAMPLE 3

Condensation of B-Cyclodextrin with an excess of N-acetylglucosamine, N-acetylgalactosamine and N-acetylmannosamine at elevated temperature a. Condensation of B-cyclodextrin with excess N-acetylglucosamine A solution of 1.135 g (0.001 mmol) of dried B-cyclodextrin and 1.548 g (0.007 mmol) of N-acetylglucosamine in 5 ml of trifluoroacetic acid was stirred at 70°-75° C. for 7 hours. The solvent was removed in vacuo, the residue was dissolved in 8 ml of concentrated ammonia and the solution was stirred overnight. After the solution had been concentrated to dryness, the saccharides were precipitated by addition of 50 ml of acetone, filtered off and dried. The mixture thus obtained was dissolved in 20 ml of hot water and the solution was stirred with an excess of toluene at 5° C. in order to precipitate the B-cyclodextrin as a toluene complex. The precipitate was filtered off and the filtrate was dialyzed against deionized water for 20 hours and brought to dryness. 0.273 g of a yellow-brown solid was obtained in this manner.

b. Condensation of B-cyclodextrin with an excess of N-acetyl galactosamine

The reaction and working up were carried out analogously to a., using 2.270 g of B-cyclodextrin (0.002 mol) and 3.096 g of N-acetylgalactosamine (0.014 mol) in 10 ml of trifluoroacetic acid. The reaction time was 72 hours at a temperature of 40°-45° C. 0.873 g of a yellow solid was obtained.

c. Condensation of B-cyclodextrin with an excess of N-acetyl mannosamine

The reaction and working up were carried out analogously to b., using 2.270 g of B-cyclodextrin (0.002 mol) and 3.096 g of N-acetylmannosamine (0.014 mol) in 10 ml of trifluoroacetic acid. To remove impurities from the crude product, this was additionally treated with 2 g of active charcoal. 0.663 g of a brown solid was obtained.

The following table shows the composition of reaction products obtained according to a., b., and c.

| EXPERIMENT | NO. OF SUBSTITUENTS | MASSES FOUND (m/z) (M + Na)+ | RELATIVE FREQUENCY | AVERAGE DEGREE OF SUBSTITUTION PER CYCLODEXTRIN |
| --- | --- | --- | --- | --- |
| a. | 0 | 1157.6 | 28% | 1.04 |
|  | 1 | 1359.7 | 100% |  |
|  | 2 | 1557.9 | 24% |  |
|  | 3 | 1766.8 | 5% |  |
| b. | 0 | 1157.6 | 40% | 1.34 |
|  | 1 | 1360.6 | 100% |  |
|  | 2 | 1563.7 | 61% |  |
|  | 3 | 1767.6 | 17% |  |
|  | 4 | 1969.6 | 7% |  |
| c. | 0 | 1157.5 | 67% | 1.00 |
|  | 1 | 1360.6 | 100% |  |
|  | 2 | 1563.8 | 51% |  |
|  | 3 | 1767.1 | 8% |  |

EXAMPLE 4

Condensation of B-cyclodextrin with peracetylated N-acetylglucosamine 2.27 g (2.0 mmol) of dried B-cyclodextrin were dissolved in 8 ml of trifluoroacetic acid and peracetylated N-acetylglucosamine (2.0 mmol) was added. The solution was then stirred overnight to 65° C. and the trifluoroacetic acid was distilled off in vacuo. The syrup which remained was dissolved in 11 ml of concentrated ammonia and the solution was stirred overnight in order to split off the O-acetyl groups. The volatile fractions were distilled off in vacuo and the carbohydrates were precipitated from the syrup which remained by addition of 50 ml of acetone. The precipitate was filtered off, washed three times with acetone and dried. The powder thus obtained was dissolved in 20 ml of water, and an excess of toluene was added, while stirring. The B-cyclodextrin-toluene complex which had crystallized out was filtered off and the filtrate was concentrated to dryness on a rotary evaporator. The composition of the solid thus obtained was analyzed by mass spectroscopy. The results are shown in the following table.

| MONO-SACCHARIDE EMPLOYED | AMOUNT OBTAINED | NO. OF SUB-STITUENTS | MASSES FOUND (m/z) |
| --- | --- | --- | --- |
| B-cyclodextrin-glucosamine-tetraacetate | 0.173 g | 0 (M + Na)+ | 1157.6; 76% |
|  |  | 1 (M + H)+ | 1360.7; 100% |
|  |  | 3 (H + Na)+ | 1388.8; 40% |

EXAMPLE 5

Condensation of B-cyclodextrin with N-acetylglucosamine in monochloroacetic acid 20.0 g. (17.6 mmol) of dry B-cyclodextrin were slowly added to 40.0 g of molten monochloroacetic acid at 85° C. After all the solid had dissolved, 6.0 g (27 mmol) of N-acetylglucosamine were added in the course of half an hour and the solution was stirred at 80° C. for a further 2 hours. The reaction mixture was cooled in an ice bath, and 50 ml of cold concentrated ammonia solution were then added. The yellow solution was concentrated to a viscous syrup on a rotary evaporator and the syrup was slowly added dropwise to a vigorously stirred mixture of 400 ml of ethanol and 200 ml of acetone the precipitate formed by this procedure was filtered off and dissolved in 200 ml of water. To remove most of the organic solvents still contained in the product, the volume was concentrated to 150 ml in an open vessel. 15 ml of toluene were then added, the precipitate was filtered off after 15 hours and the filtrate was dialyzed against deionized water for 6 hours. The solution was concentrated to 25 ml, the concentrate was stirred with 5 ml of toluene at 5° C. for 15 hours, the mixture was filtered and the filtrate was brought to dryness. The product is obtained as a yellow solid (4.18 g) which consists mainly of 2-acetamido-2-deoxyglucosyl-B-cyclodextrin ($R_f$=0.14; FABMS (M+H)+ at 1338.7 m/z, 75% and (M+Na)+ at 1360.8 m/z, 100%). A peak for unsubstituted B-cyclodextrin can also additionally be identified from the FAB mass spectrum ($R_f$=0.18; (M+Na)+ at 1157.6 m/z, 34%). Two peaks at 1419.6 m/z, 45% and at 1453.8 m/z, 79% are assigned to a monocarboxymethylated ((M+Na)+) and a dicarboxymethylated ((M+H)+) 2-acetamido-2-deoxyglucosyl-B-cyclodextrin.

EXAMPLE 6

Opening of the oxazoline ring of 2-methyl-(1,2-dideoxy-5,6-isopropylidene-α-D-glucofurano [2,1-d]-2-oxazoline with B-cyclodextrin A solution of 2.00 g (1.76 mmol) of dry B-cyclodextrin in 10 ml of trifluoroacetic acid was cooled to 0° C. and 0.50 g (2.05 mmol) of 2-methyl-(1,2-dideoxy-5,6-isopropylidene-α-D-glucofurano [2,1-d]-2-oxazoline (prepared by the method of H. Mack et al. Carbohydr. Res. 175, 311 (1988)) was added. The reaction mixture was then brought to room temperature and stirred for a further hour. Working up was carried out as described in Example 1 to give 0.325 g of a brown solid which consists of B-cyclodextrin ($R_f$=0.18; FABMS: (M+Na)+ at 1157.5 m/z, 100%), 2-acetamido-2-deoxyglucosyl-B-cyclodextrin ($R_f$=0.14; FABMS: (M+H)+ at 1337.7 m/z, 23% and (M+Na)+ at 1360.7 m/z, 35%) and traces of di-2-acetamido-2-deoxyglucosyl-B-cyclodextrin ($R_f$=0.11; (M+H)+ at 1540.4 m/z, 10%).

What is claimed is:

1. A cyclodextrin glycoside in which a cyclodextrin is substituted with a 2-acetamido-2-deoxyaldose.

2. A cyclodextrin glycoside as in claim 1, wherein the 2-acetamido-2-deoxyaldose is selected from the group consisting of N-acetylglucosamine, N-acetylmannosamine and N-acetylgalactosamine.

3. A cyclodextrin glycoside as in claim 2, wherein said 2-acetamido-2-deoxyaldose is N-acetylglucosamine.

4. A cyclodextrin glycoside as in claim 1, wherein the cyclodextrin is selected from the group consisting of α-cyclodextrin, B-cyclodextrin and γ-cyclodextrin.

5. A cyclodextrin glycoside as in claim 4, wherein the cyclodextrin is α-cyclodextrin.

6. A cyclodextrin glycoside as in claim 4, wherein the cyclodextrin is B-cyclodextrin.

7. A cyclodextrin glycoside as in claim 4, wherein the cyclodextrin is γ-cyclodextrin.

8. A cyclodextrin glycoside as in claim 2, wherein the cyclodextrin is selected from the group consisting of α-cyclodextrin, B-cyclodextrin and γ-cyclodextrin.

9. A cyclodextrin glycoside as in claim 8, wherein the cyclodextrin is α-cyclodextrin.

10. A cyclodextrin glycoside as in claim 8, wherein the cyclodextrin is B-cyclodextrin.

11. A cyclodextrin glycoside as in claim 8, wherein the cyclodextrin is γ-cyclodextrin.

12. A cyclodextrin glycoside as in claim 3, wherein the cyclodextrin is selected from the group consisting of α-cyclodextrin, B-cyclodextrin and γ-cyclodextrin.

13. A cyclodextrin glycoside as in claim 12, wherein the cyclodextrin is α-cyclodextrin.

14. A cyclodextrin glycoside as in claim 12, wherein the cyclodextrin is B-cyclodextrin.

15. A cyclodextrin glycoside as in claim 12, wherein the cyclodextrin is γ-cyclodextrin, 16. A process for the preparation of a cyclodextrin glycoside comprising
    (a) reacting a cyclodextrin with a 2-acetamido-2-deoxyaldose or an acetylated derivative thereof in an anhydrous acid medium; and
    (b) treating the reaction product formed in step (a) with a mild base.

17. A process for the preparation of a cyclodextrin glycoside comprising reacting a cyclodextrin with an oxazoline derivative of a 2-acetamido-2-deoxyaldose.

* * * * *